United States Patent Office

3,519,636
Patented July 7, 1970

3,519,636
CATALYTIC MERCAPTOBENZOTHIAZOLE PROCESS WITH PHOSPHOROUS SULFIDE CATALYST
Hanno Maria Merlin, Somerville, N.J., George Constantine Goulandris, Brooklyn, N.Y., and Hans Erich Grethlein, Martinsville, N.J., assignors to American Cyanamid Company, Stamford, Conn., a corporation of Maine
No Drawing. Filed Oct. 10, 1967, Ser. No. 674,092
Int. Cl. C07d 91/48
U.S. Cl. 260—306                                6 Claims

ABSTRACT OF THE DISCLOSURE

This invention relates to a novel process for making 2-mercaptobenzothiazole. More particularly, this invention relates to a novel catalytic process for making 2-mercaptobenzothiazole by reacting aniline, carbon disulfide and sulfur in the presence of a catalyst which comprises phosphorous sulfides or mixtures of phosphorous sulfides and certain thiazole compounds.

---

This invention relates to a novel process for making 2-mercaptobenzothiazole. More particularly, this invention relates to a novel catalytic process for making 2-mercaptobenzothiazole by reacting aniline, carbon disulfide and sulfur in the presence of a catalyst which comprises phosphorous sulfides or mixtures of phosphorous sulfides and certain thiazole compounds.

Among the large number of thiazole derivatives which are manufactured and used extensively as vulcanization accelerators for both natural and synthetic rubber, 2-mercaptothiazole is of prime importance. Methods of preparing 2-mercaptobenzothiazole have been the subject of extensive investigation for many years. The most commonly used synthesis is one based on the reaction of aniline, carbon disulfide, and sulfur. According to this method the reactants are charged to a suitable pressure vessel, for example, an autoclave, and heated at elevated temperatures for moderately long periods of time, i.e., up to about eight hours. As the reaction proceeds hydrogen sulfide, produced as a byproduct of the reaction, accumulates and results in a pressure buildup in the autoclave.

Useful yields of 2-mercaptobenzothiazole are produced in this manner, i.e., greater than 80%, biased on the aniline consumed. While this is a commercially useful process, there are distinct disadvantages inherent in it which result in high cost of manufacture. Thus, one of the major disadvantages of the conventional process is that extensive amounts of byproduct tars are produced. This not only reduces the yield of 2-mercaptobenzothiazole, but it also necessitates a costly recovery step to bring the product to a desirable level of purity.

An additional disadvantage of conventional processes is the long reaction time required to obtain good yield of 2-mercaptobenzothiazole. Any method, therefore, which would reduce the reaction time required would obviously be economically advantageous, resulting in higher production capacity.

Benzothiazole is a byproduct in the manufacture of 2-mercaptobenzothiazole. This byproduct is used as an intermediate in the manufacture of other products, such as o-aminothiophenol by a caustic fusion process. The latter is also an important intermediate. Until the present time, benzothiazole has not been produced in good yields in conventional processes. It would thus be an added advantage if the manufacture of 2-mercaptobenzothiazole yielded more benzothiazole and less of the tarry byproducts.

It is an object of this invention to provide a new method of producing 2-mercaptobenzothiazole whereby good yields of high-purity product are obtained. Other objects will become apparent from the following description of the invention.

It has now been discovered that if the reaction of aniline, carbon disulfide or sulfur is carried out in the presence of certain phosphorous sulfides, as described below, and under the same reaction conditions as used in the conventional process, the rate of reaction is increased by a factor of up to five times and increased yields of 2-mercaptobenzothiazole are obtained in one-fourth the time presently required. It has also been discovered that when certain thiazoles, notably mercaptobenzothiazolyldisulfide, are added as part of the phosphorus sulfide catalyst compositions, additional improvements in the rate of reaction and yield of product are achieved.

An additional feature of the present invention is the discovery that when the reaction is catalyzed as described above, essentially no tars are produced and the yield of the byproduct benzothiazole is increased by as much as 50% over the amount obtained by the conventional uncatalyzed reaction.

These results are surprising in that it was not previously possible to effectively catalyze the reaction. It is also surprising in view of the fact that certain compounds which might be expected to exhibit catalytic activity in this reaction are relatively ineffective, as for example, ammonium sulfide, triphenyl phosphine, diphenylamine, and an ethylene tetrasulfide polymer.

The process of this invention provides a means of producing 2-mercaptobenzothiazole wherein an essentially complete conversion of aniline to product is achieved in considerably less time, in higher yields and with better product purity and lower tar formation than heretofore possible.

According to the process of the present invention, aniline, carbon disulfide, and sulfur are charged to an autoclave along with a catalyst consisting of a phosphorous sulfide or a mixture of a phosphorous sulfide and a thiazole. The reaction mixture is then heated under pressure at an elevated temperature for a specified period of time, vented to remove excess carbon disulfide and/or hydrogen sulfide, and the product recovered by conventional means.

The range of concentration of reactants used in carrying out the reaction according to the present invention may vary widely. Although it is stoichiometrically possible, and indeed practical, to use equivalent amounts of aniline, carbon disulfide, and sulfur in conducting the reaction, it has been found to be advantageous to utilize about 0.5 to 2.0 moles or preferably about 0.8 to 1.4 moles, each of carbon disulfide and sulfur, for each mole of aniline.

The temperature used in carrying out the reaction is not especially critical, but will generally be in the range of from 180° C. to about 300° C., or preferably from 220° C. to 250° C.

The pressure which is achieved in the autoclave is due mainly to the vapor pressure of carbon disulfide and byproduct hydrogen sulfide at the temperature of reaction. It is permissible, but not necessary, to additionally pressurize the autoclave with an inert gas, such as nitrogen, carbon dioxide, etc. The reaction pressure is not especially critical but will usually be in the range of from about 300 lbs./in.$^2$, preferably 800 to 1500 lbs./in.$^2$.

Among the phosphorous sulfides which may be used to catalyze the reaction are phosphorous pentasulfide, phosphorous sesquisulfide, phosphorous tetrasulfide, and phosphorous heptasulfide. The concentration of phosphorous sulfide used to catalyze the reaction is critical, and is based on the amount of aniline charged to the reaction mixture. Thus, the desirable results of the present invention are achieved when the phosphorous sulfide is used in a concentration of from 0.01 to about 5.0 mole percent, based on the amount of aniline used. However, preferably from 0.5 to 1.5 mole percent is used.

Among the thiazoles which may be used effectively as co-catalysts with the phosphorous sulfides mentioned above are mercaptobenzothiazolyldisulfide, and N-mono or N,N-disubstituted alkyl, aryl, aralkyl, or alicyclic derivatives of benzothiazole-2-sulfenamide, such as, for example, N-ethyl or N,N-diethyl-benzothiazole-2-sulfenamide, N-phenyl or N,N-diphenyl-benzothiazole-2-sulfenamide, N-benzyl or N,N-dibenzylbenzothiazole-2-sulfenamide, N-cyclohexyl or N,N-dicyclohexylbenzothiazole-2-sulfenamide, and N,N-oxydiethylene-benzothiazole-2-sulfenamide, etc.

When using a combination of a phosphorous sulfide and a benzothiazole as a catalyst in the present invention, the concentration of the mixed catalyst will be as defined above for use of the phosphorous sulfide by itself. However, the mole ratio of phosphorous sulfide:thiazole used in the catalyst combination should be in the range of from 0.5 to 8.0, preferably 0.5 to 3.0.

2-mercaptobenzothiazole is a well known accelerator of vulcanization for both natural and synthetic rubber and as such is a very important commercial material. It has also found use in fungicidal and bacteriocidal applications.

The invention is illustrated by the examples which follow.

EXAMPLE 1

A mixture of 4.65 parts (0.05 mole) of aniline, 3.80 parts (0.05 mole) of carbon disulfide, and 1.60 parts (0.05 mole) of sulfur was added to a mini-clave and heated to 240° C. Samples were withdrawn at one hour intervals with the following results:

| Time, hours: | Aniline converted to MBT, percent |
|---|---|
| 1 | 20 |
| 2 | 53 |
| 3 | 72 |
| 4 | 79 |
| 5 | 82 |
| 6 | 83 |

This example illustrates the preparation of 2-mercaptobenzothiazole according to the conventional process using equimolar quantities of reactants, and further illustrates the reaction time required to achieve optimum yields of product. The yield of benzothiazole after 6 hours of reaction is 3.6%.

EXAMPLE 2

The procedure of Example 1 was followed except that 1 mole-percent, based on the aniline charged to the mini-clave of phosphorous pentasulfide was added to the reactant mixture. The following results were obtained:

| Time, hours: | Aniline converted to MBT, percent |
|---|---|
| 0.5 | 63 |
| 1.0 | 81 |
| 1.25 | 83 |
| 2.0 | 82 |
| 3.0 | 81 |

This example represents a preferred embodiment of the present invention and illustrates the reduction in reaction time achieved by the use of phosphorous pentasulfide as a catalyst.

EXAMPLE 3

The procedure of Example 1 was followed except that 0.004 mole of phosphorous pentasulfide and 0.002 mole of mercaptobenzothiazolyldisulfide (0.8 and 0.4 mole-percent respectively, based on the aniline charged to the mini-clave) was added to the reaction mixture. The following results were obtained:

| Time, hours: | Aniline converted to MBT, percent |
|---|---|
| 1 | 61 |
| 2 | 79 |
| 3 | 85 |
| 4 | 85 |
| 4 | 86 |
| 4.5 | 87 |

In this example 6% of benzothiazole was obtained after 4 hours, compared with 3.6% benzothiazole after 6 hours in Example 1. This example represents a preferred embodiment of the present invention and illustrates the higher yield of 2-mercaptobenzothiazole and the reduced reaction time using a catalyst mixture.

EXAMPLE 4

A mixture of 4.65 parts of aniline (0.05 mole), 4.56 parts of carbon disulfide (0.06 mole), and 1.73 parts of sulfur (0.54 mole) was added to a mini-clave. A catalyst mixture consisting of phosphorous pentasulfide and mercaptobenzothiazolyldisulfide (0.8 and 0.4 mole-percent respectively, based on the aniline charged to the reaction mixture) was added and the reaction heated to 240° C. Samples were withdrawn at the time intervals indicated with the following results:

| Time, hours: | Aniline converted to MBT, percent |
|---|---|
| 1.5 | 84 |
| 3.0 | 92 |
| 4.5 | 91 |

In this example 5.8% of benzothiazole was obtained after 4.5 hours compared with 3.6% after 6 hours in Example 1. This example represents another preferred embodiment of the present invention and illustrates the higher yield and reduced reaction time achieved when the mole ratio of reactants is optimized at other than unity.

EXAMPLE 5

The procedure of Example 1 was followed except that 1 mole-percent of phosphorous sesquisulfide (based on the aniline charged) was used as the catalyst. Samples were withdrawn at the time intervals indicated with the following results:

| Time, hours: | Aniline converted to MBT, percent |
|---|---|
| 0.5 | 65 |
| 1.0 | 77 |
| 1.5 | 78 |
| 2.0 | 77 |
| 2.5 | 75 |

In this example 4.6% of benzothiazole was obtained after 2.5 hours as compared with 3.6% after 6 hours in Example 1. This example represents a preferred embodiment of the present invention wherein the catalyst is phosphorous sesquisulfide.

EXAMPLE 6

The procedure of Example 1 was followed except that 1 mole-percent of N,N,N′,N′-tetramethyl guanidine (based on the aniline charged) was used as the catalyst. Samples were extracted from the reaction mixture at one hour intervals with the following results:

| Time, hours: | Aniline converted to MBT, percent |
|---|---|
| 1 | 31 |
| 2 | 65 |
| 3 | 78 |
| 4 | 83 |
| 5 | 84 |

This example illustrates the ineffectiveness of a material which might be expected to exhibit some activity in promoting the reaction.

EXAMPLE 7

The procedure of Example 1 was followed except that 1 mole-percent of Vanadium pentoxide (based on the aniline charged) was used as the catalyst. Samples were withdrawn from the reaction mixture at one hour intervals with the following results:

| Time, hours: | Aniline converted to MBT, percent |
|---|---|
| 1 | 30 |
| 2 | 62 |
| 3 | 77 |
| 4 | 79 |

This example illustrates the ineffectiveness of a catalyst which might be expected to exhibit some activity in promoting the reaction.

What is claimed is:

1. In a process for the manufacture of 2-mercaptobenzothiazole wherein aniline, carbon disulfide, and sulfur are heated at an effective temperature under pressure in an autoclave, and wherein the mole ratio of carbon disulfide and sulfur to aniline is about 0.5 to 2.0 moles of each per mole of aniline, the improvement which comprises carrying out the reaction in contact with a phosphorous sulfide compound in an amount of 0.01 to about 5.0 mole percent based on aniline.

2. A process according to claim 1 wherein the reaction is conducted at a temperature of from 180 to 300° C.

3. A process according to claim 1 wherein the phosphorous sulfide is selected from the group consisting of phosphorous pentasulfide, phosphorous sesquisulfide, phosphorous tetrasulfide, and phosphorous heptasulfide.

4. A process according to claim 1 wherein a thiazole is used as a cocatalyst.

5. The process of claim 5 wherein the thiazole is selected from the group consisting of mercaptobenzothiazolyldisulfide, and N-mono or N,N-disubstituted alkyl, aryl, aralkyl and alicyclic derivatives of benzothiazole-2-sulfenamide.

6. A process according to claim 1 wherein the catalyst is a mixture of a phosphorous sulfide and a thiazole, and wherein the mole ratio of phosphorous sulfide:thiazole is from about 0.5 to about 8.0 moles per mole of thiazole.

References Cited

UNITED STATES PATENTS

| 1,631,871 | 6/1927 | Kelly | 260—306 |
| 2,631,153 | 3/1953 | Paul et al. | 260—306 |

ALEX MAZEL, Primary Examiner

R. J. GALLAGHER, Assistant Examiner

U.S. Cl. X.R.

260—999

UNITED STATES PATENT OFFICE
CERTIFICATE OF CORRECTION

Patent No. 3,519,636   Dated July 7, 1970

Inventor(s) Hanno Maria Merlin, George Constantine Goulandris et al

It is certified that error appears in the above-identified patent and that said Letters Patent are hereby corrected as shown below:

Column 4, line 7, delete "4- - - - - - - 85" as appears on page 6, line 19 of the original specification.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents